(12) United States Patent
Zhou et al.

(10) Patent No.: US 11,757,832 B2
(45) Date of Patent: *Sep. 12, 2023

(54) IP ADDRESS ALLOCATION SYSTEM AND METHOD

(71) Applicant: Huawei Technologies Co., Ltd., Shenzhen (CN)

(72) Inventors: Wei Zhou, Shanghai (CN); Zhongping Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/126,805

(22) Filed: Dec. 18, 2020

(65) Prior Publication Data

US 2021/0250326 A1    Aug. 12, 2021

Related U.S. Application Data

(63) Continuation of application No. 16/798,200, filed on Feb. 21, 2020, now Pat. No. 10,873,562, which is a
(Continued)

(51) Int. Cl.
*G06F 15/16* (2006.01)
*H04L 61/5014* (2022.01)
(Continued)

(52) U.S. Cl.
CPC .......... *H04L 61/5014* (2022.05); *H04L 61/59* (2022.05); *H04L 45/54* (2013.01)

(58) Field of Classification Search
CPC . H04L 61/2015; H04L 61/6013; H04L 45/54; H04L 61/5014; H04L 61/59
(Continued)

(56) References Cited

U.S. PATENT DOCUMENTS 6,587,468 B1    7/2003  Dos Santos et al.
7,152,117 B1   12/2006  Stapp et al.
(Continued)

FOREIGN PATENT DOCUMENTS

CN    101072229 A    11/2007
CN    101321383 A    12/2008
(Continued)

OTHER PUBLICATIONS

"DHCP Technology White Paper," Hangzhou H3C Technologies Co., Ltd., 2008, 20 pages.

*Primary Examiner* — Kaylee J Huang
(74) *Attorney, Agent, or Firm* — Conley Rose, P.C.

(57) ABSTRACT

An internet protocol (IP) address allocation method includes receiving, by a forwarder, an address request sent by an external network element, where the address request includes a dynamic host configuration protocol (DHCP) request of user equipment (UE) and user characteristic information of the UE, acquiring, from a DHCP service network element according to the DHCP request, an IP address allocated to the UE, and acquiring first instruction information that is delivered by a control device according to the user characteristic information of the UE and the IP address allocated to the UE, and sending the IP address to the UE according to the user characteristic information.

20 Claims, 7 Drawing Sheets

Related U.S. Application Data continuation of application No. 14/979,380, filed on Dec. 27, 2015, now Pat. No. 10,574,626, which is a continuation of application No. PCT/CN2013/078068, filed on Jun. 26, 2013.

(51) Int. Cl.
  *H04L 61/59* (2022.01)
  *H04L 45/00* (2022.01)

(58) Field of Classification Search
  USPC .................................. 709/245, 220, 222
  See application file for complete search history.

(56) References Cited

U.S. PATENT DOCUMENTS

| | | | |
|---|---|---|---|
| 7,533,160 B2 | 5/2009 | Hsu | |
| 7,567,804 B1 | 7/2009 | Mangal | |
| 8,438,631 B1 | 5/2013 | Taylor et al. | |
| 2004/0095943 A1* | 5/2004 | Korotin | H04L 29/12018 370/401 |
| 2008/0065747 A1* | 3/2008 | Kubota | H04L 61/6013 709/220 |
| 2010/0142488 A1 | 6/2010 | Zhang et al. | |
| 2010/0191839 A1* | 7/2010 | Gandhewar | H04L 61/2015 709/220 |
| 2011/0075675 A1 | 3/2011 | Koodli et al. | |
| 2011/0202658 A1* | 8/2011 | Okuno | H04L 67/34 709/226 |
| 2011/0238800 A1 | 9/2011 | Ishimoto | |
| 2012/0057503 A1* | 3/2012 | Ding | H04W 24/02 370/254 |
| 2012/0195232 A1 | 8/2012 | Mahkonen et al. | |
| 2012/0252355 A1 | 10/2012 | Huang et al. | |
| 2012/0300615 A1 | 11/2012 | Kempf et al. | |
| 2013/0003736 A1 | 1/2013 | Szyszko et al. | |
| 2014/0006575 A1 | 1/2014 | Subramanian | |
| 2014/0068030 A1 | 3/2014 | Chambers et al. | |
| 2014/0254605 A1* | 9/2014 | Anumala | H04L 45/38 370/401 |
| 2014/0269535 A1* | 9/2014 | Pazhyannur | H04W 40/24 370/329 |
| 2014/0330959 A1* | 11/2014 | Zhang | H04L 12/2803 709/224 |
| 2015/0244617 A1* | 8/2015 | Nakil | G06F 11/07 709/224 |
| 2015/0326524 A1* | 11/2015 | Tankala | G06F 9/45558 709/245 |
| 2015/0350156 A1 | 12/2015 | Ma et al. | |

FOREIGN PATENT DOCUMENTS

| | | |
|---|---|---|
| CN | 103067534 A | 4/2013 |
| CN | 103166876 A | 6/2013 |
| CN | 102369753 B | 8/2014 |
| CN | 103155683 B | 11/2015 |
| EP | 2541975 A2 | 1/2013 |

\* cited by examiner

IP ADDRESS ALLOCATION SYSTEM AND METHOD

CROSS-REFERENCE TO RELATED APPLICATIONS

This application is a continuation of U.S. patent application Ser. No. 16/798,200 filed on Feb. 21, 2020, which is a continuation of U.S. patent application Ser. No. 14/979,380 filed on Dec. 27, 2015, now U.S. Pat. No. 10,574,626, which is a continuation of International Patent Application No. PCT/CN2013/078068 filed on Jun. 26, 2013. All of the aforementioned patent applications are hereby incorporated by reference in their entireties.

TECHNICAL FIELD

Embodiments relate to the field of communications, and in particular, to an IP address allocation method and system.

BACKGROUND

Currently, in software-defined networking (SDN), a network switching model protocol OPENFLOW, as a type of switching standard in an SDN network, implements separation between a control plane and a forwarding plane. Based on the standard OPENFLOW, main components of the SDN network includes a forwarder supporting OPENFLOW and a control device configured to manage a switching device, where a forwarding behavior of the forwarder is determined by the control device.

After the SDN using the standard OPENFLOW is introduced into a system architecture evolution (SAE) architecture, after receiving a Dynamic Host Configuration Protocol (DHCP) request sent by a user side, the forwarder cannot respond to the request, causing that a user cannot acquire an address in a DHCP manner.

SUMMARY

Embodiments of the present disclosure provide an internet protocol (IP) address allocation system and method, which implement, if a control device is separated from a forwarder, a function that enables a user to acquire an IP address in a DHCP manner, and compared with other approaches, overcome an disadvantage that a user cannot acquire an address in a DHCP manner in an SAE network architecture of SDN.

In order to achieve the foregoing objectives, technical solutions used in the embodiments of the present disclosure are as follows.

According to a first aspect, an embodiment of the present disclosure provides a forwarder, applied in a system in which a control plane is separated from a forwarding plane, including a communications unit, configured to communicate with an external network element, and a processor, configured to receive, by using the communications unit, an address request sent by the external network element, where the address request includes a DHCP request of user equipment (UE) and user characteristic information of the UE, acquire, from a DHCP service network element according to the DHCP request, an IP address allocated to the UE, acquire, by using the communications unit, first instruction information that is delivered by a control device according to the user characteristic information of the UE and the IP address allocated to the UE, wherein the first instruction information is used to indicate sending, when a packet whose destination address is the IP address is received, the packet to the UE according to the user characteristic information, and send the IP address to the UE according to the user characteristic information by using the communications unit.

With reference to the first aspect, in a first possible implementation manner, that the processor is configured to acquire, from a DHCP service network element according to the DHCP request, an IP address allocated to the UE specifically includes the processor is configured to send the DHCP request to the DHCP service network element by using the communications unit, and receive, by using the communications unit, a DHCP request response sent by the DHCP service network element, where the DHCP request response includes the IP address allocated to the UE, and a destination address of the DHCP request response is the IP address allocated to the UE, and that the processor is configured to send the IP address to the UE according to the user characteristic information by using the communications unit specifically includes the processor is configured to send the DHCP request response to the UE according to the first instruction information by using the communications unit.

With reference to the first aspect or the first possible implementation manner, in a second possible implementation manner, that the processor is configured to acquire, from a DHCP service network element according to the DHCP request, an IP address allocated to the UE, and acquire, by using the communications unit, first instruction information that is delivered by a control device according to the user characteristic information of the UE and the IP address allocated to the UE specifically includes the processor is configured to send the DHCP request and the user characteristic information of the UE to the control device by using the communications unit, where the control device supports a DHCP service, and receive, by using the communications unit, the IP address allocated to the UE and the first instruction information that are sent by the control device.

With reference to the first aspect or the first possible implementation manner, in a third possible implementation manner, that the processor is configured to acquire, from a DHCP service network element according to the DHCP request, an IP address allocated to the UE specifically includes the processor is configured to send the DHCP request to a DHCP server by using the communications unit, and receive, by using the communications unit, the IP address allocated by the DHCP server to the UE, and that the processor is configured to acquire first instruction information that is delivered by a control device according to the user characteristic information of the UE and the IP address allocated to the UE specifically includes the processor is configured to send, by using the communications unit, the IP address allocated to the UE and the user characteristic information of the UE to the control device, and receive, by using the communications unit, the first instruction information that is delivered by the control device according to the IP address allocated to the UE and the user characteristic information of the UE.

With reference to the third possible implementation manner, in a fourth possible implementation manner, the processor is further configured to send the DHCP request to the control device by using the communications unit, and receive, by using the communications unit, second instruction information sent by the control device, where the second instruction information is used to indicate forwarding, when the DHCP request is received, the DHCP request to the DHCP server, and that the processor is configured to send the DHCP request to a DHCP server by using the communications unit specifically includes the processor is configured to send the DHCP request to the DHCP server according to the second instruction information by using the communications unit.

According to a second aspect, an embodiment of the present disclosure provides a control device, applied in a system in which a control plane is separated from a forwarding plane, including a communications unit, configured to communicate with an external network element, and a processor, configured to acquire user characteristic information of UE and an IP address allocated to the UE, and send first instruction information to a forwarder by using the communications unit, where the first instruction information is used to instruct the forwarder to send, when a packet whose destination address is the IP address is received, the packet to the UE according to the user characteristic information, where the forwarder is controlled by the control device.

With reference to the second aspect, in a first possible implementation manner, that the processor is configured to acquire user characteristic information of UE and an IP address allocated to the UE specifically includes the processor is configured to receive, by using the communications unit, a DHCP request of the UE and the user characteristic information of the UE that are sent by the forwarder, where the control device supports a DHCP service, allocate the IP address to the UE, and deliver, by using the communications unit according to the user characteristic information of the UE and the IP address allocated to the UE, the IP address allocated to the UE and the first instruction information to the forwarder.

With reference to the second aspect, in a second possible implementation manner, that the processor is configured to acquire user characteristic information of UE and an IP address allocated to the UE specifically includes the processor is configured to receive, by using the communications unit, the IP address allocated to the UE and the user characteristic information of the UE that are sent by the forwarder, and deliver the first instruction information to the forwarder according to the IP address allocated to the UE and the user characteristic information of the UE.

With reference to the second possible implementation manner, in a third possible implementation manner, the processor is further configured to receive, by using the communications unit, a DHCP request of the UE that is sent by the forwarder, and send second instruction information to the forwarder by using the communications unit, where the second instruction information is used to instruct the forwarder to forward, when the DHCP request is received, the DHCP request to a DHCP server.

According to a third aspect, an embodiment of the present disclosure provides an address allocation method, applied in a system in which a control plane is separated from a forwarding plane, including receiving, by a forwarder, an address request sent by an external network element, where the address request includes a DHCP request of UE and user characteristic information of the UE, acquiring, by the forwarder from a DHCP service network element according to the DHCP request, an IP address allocated to the UE, acquiring, by the forwarder, first instruction information that is delivered by a control device according to the user characteristic information of the UE and the IP address allocated to the UE, where the first instruction information is used to indicate sending, when a packet whose destination address is the IP address is received, the packet to the UE according to the user characteristic information, and sending, by the forwarder, the IP address to the UE according to the user characteristic information.

With reference to the third aspect, in a first possible implementation manner, the acquiring, by the forwarder from a DHCP service network element according to the DHCP request, an IP address allocated to the UE specifically includes sending, by the forwarder, the DHCP request to the DHCP service network element, and receiving a DHCP request response sent by the DHCP service network element, where the DHCP request response includes the IP address allocated to the UE, and a destination address of the DHCP request response is the IP address allocated to the UE, and the sending, by the forwarder, the IP address to the UE according to the user characteristic information specifically includes sending, by the forwarder, the DHCP request response to the UE according to the first instruction information.

With reference to the third aspect or the first possible implementation manner, in a second possible implementation manner, the acquiring, by the forwarder from a DHCP service network element according to the DHCP request, an IP address allocated to the UE, and the acquiring, by the forwarder, first instruction information that is delivered by a control device according to the user characteristic information of the UE and the IP address allocated to the UE specifically include sending, by the forwarder, the DHCP request and the user characteristic information of the UE to the control device, where the control device supports a DHCP service, and receiving, by the forwarder, the IP address allocated to the UE and the first instruction information that are sent by the control device.

With reference to the third aspect or the first possible implementation manner, in a third possible implementation manner, the acquiring, by the forwarder from a DHCP service network element according to the DHCP request, an IP address allocated to the UE specifically includes sending, by the forwarder, the DHCP request to a DHCP server, and receiving, by the forwarder, the IP address allocated by the DHCP server to the UE, and the acquiring, by the forwarder, first instruction information that is delivered by a control device according to the user characteristic information of the UE and the IP address allocated to the UE specifically includes sending, by the forwarder, the IP address allocated to the UE and the user characteristic information of the UE to the control device, and receiving the first instruction information that is delivered by the control device according to the IP address allocated to the UE and the user characteristic information of the UE.

With reference to the third possible implementation manner, in a fourth possible implementation manner, the sending, by the forwarder, the DHCP request to a DHCP server specifically includes sending, by the forwarder, the DHCP request to the control device, and receiving, by the forwarder, second instruction information sent by the control device, where the second instruction information is used to indicate forwarding, when the DHCP request is received, the DHCP request to the DHCP server, and the sending, by the forwarder, the DHCP request to a DHCP server specifically includes sending, by the forwarder, the DHCP request to the DHCP server according to the second instruction information by using the communications unit.

According to a fourth aspect, an embodiment of the present disclosure provides an address allocation method, applied in a system in which a control plane is separated from a forwarding plane, including acquiring, by a control device, user characteristic information of UE and an IP address allocated to the UE, and sending, by the control device, first instruction information to a forwarder, where the first instruction information is used to instruct the forwarder to send, when a packet whose destination address is the IP address is received, the packet to the UE according to the user characteristic information, where the forwarder is controlled by the control device.

With reference to the fourth aspect, in a first possible implementation manner, the acquiring, by a control device, user characteristic information of UE and an IP address allocated to the UE specifically includes receiving, by the control device, a DHCP request of the UE and the user characteristic information of the UE that are sent by the forwarder, where the control device supports a DHCP service, allocating, by the control device, the IP address to the UE, and delivering, by the control device according to the user characteristic information of the UE and the IP address allocated to the UE, the IP address allocated to the UE and the first instruction information to the forwarder.

With reference to the fourth aspect, in a second possible implementation manner, the acquiring, by a control device, user characteristic information of UE and an IP address allocated to the UE specifically includes receiving, by the control device, the IP address allocated to the UE and the user characteristic information of the UE that are sent by the forwarder, and delivering the first instruction information to the forwarder according to the IP address allocated to the UE and the user characteristic information of the UE.

With reference to the second possible implementation manner, in a third possible implementation manner, the receiving, by the control device, the IP address and the user characteristic information that are sent by the forwarder specifically includes receiving, by the control device, a DHCP request of the UE that is sent by the forwarder, and sending, by the control device, second instruction information to the forwarder, where the second instruction information is used to instruct the forwarder to forward, when the DHCP request is received, the DHCP request to a DHCP server.

According to a fifth aspect, a forwarder is provided, applied in a system in which a control plane is separated from a forwarding plane, including a receiving unit, configured to receive an address request sent by an external network element, where the address request includes a DHCP request of UE and user characteristic information of the UE, an acquiring unit, configured to acquire, from a DHCP service network element according to the DHCP request, an IP address allocated to the UE, where the acquiring unit is further configured to acquire first instruction information that is delivered by a control device according to the user characteristic information of the UE and the IP address allocated to the UE, where the first instruction information is used to indicate sending, when a packet whose destination address is the IP address is received, the packet to the UE according to the user characteristic information, and a sending unit, configured to send the IP address to the UE according to the user characteristic information.

With reference to the fifth aspect, in a first possible implementation manner, the acquiring unit is specifically configured to send the DHCP request to the DHCP service network element, and receive a DHCP request response sent by the DHCP service network element, where the DHCP request response includes the IP address allocated to the UE, and a destination address of the DHCP request response is the IP address allocated to the UE, and the sending unit is specifically configured to send the DHCP request response to the UE according to the first instruction information.

With reference to the fifth aspect or the first possible implementation manner, in a second possible implementation manner, the acquiring unit includes a first sending subunit, configured to send the DHCP request and the user characteristic information of the UE to the control device, where the control device supports a DHCP service, and a first receiving subunit, configured to receive the IP address allocated to the UE and the first instruction information that are sent by the control device.

With reference to the fifth aspect or the first possible implementation manner, in a third possible implementation manner, the acquiring unit includes a second sending subunit, configured to send the DHCP request to a DHCP server, and a second receiving subunit, configured to receive the IP address allocated by the DHCP server to the UE, where the second sending subunit is further configured to send the IP address allocated to the UE and the user characteristic information of the UE to the control device, so that the control device delivers the first instruction information to the forwarder according to the IP address and the user characteristic information, and the second receiving subunit is further configured to receive the first instruction information that is delivered by the control device according to the IP address of the UE and the user characteristic information of the UE.

With reference to the third possible implementation manner, in a fourth possible implementation manner, the sending unit is further configured to send the DHCP request to the control device, the receiving unit is further configured to receive second instruction information sent by the control device, where the second instruction information is used to indicate forwarding, when the DHCP request is received, the DHCP request to the DHCP server, and the sending unit is further specifically configured to send the DHCP request to the DHCP server according to the second instruction information.

According to a sixth aspect, a control device is provided, applied in a system in which a control plane is separated from a forwarding plane, including an acquiring unit, configured to acquire user characteristic information of UE and an IP address allocated to the UE, and a sending unit, configured to send first instruction information to a forwarder, where the first instruction information is used to instruct the forwarder to send, when a packet whose destination address is the IP address is received, the packet to the UE according to the user characteristic information, where the forwarder is controlled by the control device.

With reference to the sixth aspect, in a first possible implementation manner, the acquiring unit further includes a first receiving subunit, configured to receive a DHCP request of the UE and the user characteristic information of the UE that are sent by the forwarder, where the control device supports a DHCP service, an allocation subunit, configured to allocate the IP address to the UE, and a delivering subunit, configured to deliver the IP address allocated to the UE and the first instruction information to the forwarder according to the user characteristic information of the UE and the IP address allocated to the UE.

With reference to the sixth aspect, in a second possible implementation manner, the acquiring unit further includes a second receiving subunit, configured to receive the IP address allocated to the UE and the user characteristic information of the UE that are sent by the forwarder, and deliver the first instruction information to the forwarder according to the IP address allocated to the UE and the user characteristic information of the UE.

With reference to the second possible implementation manner, in a third possible implementation manner, the second receiving subunit further includes a receiving module, configured to receive a DHCP request of the UE that is sent by the forwarder, and a sending module, configured to send second instruction information to the forwarder, where the second instruction information is used to instruct the forwarder to forward, when the DHCP request is received, the DHCP request to a DHCP server.

According to a seventh aspect, an embodiment of the present disclosure provides a system in which a control plane is separated from a forwarding plane, including any forwarder according to the first aspect and any control device according to the second aspect, or including any forwarder according to the fifth aspect and any control device according to the sixth aspect.

The embodiments of the present disclosure provide an IP address allocation system and method, which implement, if a control device is separated from a forwarder, a function that enables a user to acquire an IP address in a DHCP manner, and compared with other approaches, overcome an disadvantage that a user cannot acquire an address in a DHCP manner in an SAE network architecture of SDN.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

The method provided in the embodiments of the present disclosure may be applied to various communications systems, such as a Global System for Mobile Communications (GSM) network, a General Packet Radio Service (GPRS) network, a wideband code-division multiple access (WCDMA) network, a code-division multiple access (CDMA)-2000 network, a Time Division-Synchronous Code Division Multiple Access (TD-SCDMA) network, or a Worldwide Interoperability for Microwave Access (WiMAX) network.

In the present disclosure, a SAE/LTE network is used as an example for description. Certainly, the present disclosure is not limited to application in only this scenario.

Figure 1:
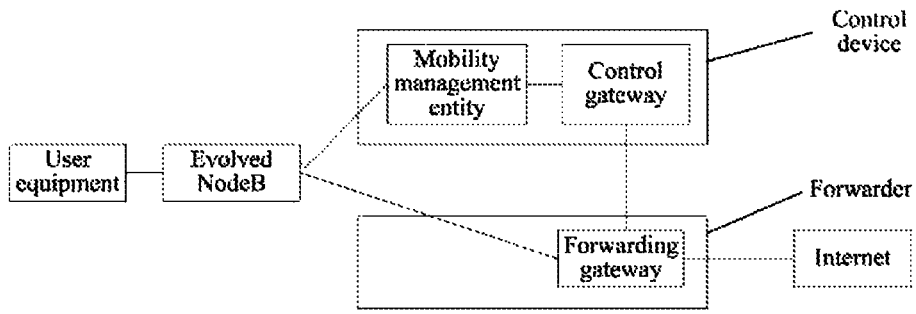
FIG. 1 is a diagram of an SAE/long term evolution (LTE) network architecture into which SDN is introduced.

Exemplarily, an SAE/LTE network may include two parts an access network and a core network, where the access network includes UE and an evolved NodeB (eNodeB), and the eNodeB is configured to provide the UE with an air interface, so that the UE accesses the SAE/LTE network. In the embodiments of the present disclosure, devices included in the access network make no contributions to technology improvements, therefore, the devices included in the access network are collectively referred to as a user side. Key logical network elements of the core network include a mobility management entity (MME), a serving gateway (S-GW), and a packet data gateway (P-GW). The MME is configured to take charge of a control function of the core network of the SAE/LTE network, and perform mobility management and session management of UE. The S-GW and the P-GW may be configured to provide a data transmission service for the user side. After the SDN is introduced into the foregoing SAE/LTE network architecture, control functions and forwarding functions of the core network elements are separated, and an SDN-based SAE/LTE network architecture shown in FIG. 1 can be obtained, where a control device implements control plane functions of the core network elements, including gateway control functions of the S-GW and the P-GW and a function of the MME, and can perform configuration and management on a forwarder according to the OPENFLOW protocol, and the forwarder implements forwarding plane functions of the core network elements, including gateway forwarding functions of the S-GW and the P-GW, and can process a data packet according to the configuration and management performed by the control device on the forwarder.

Figure 2:
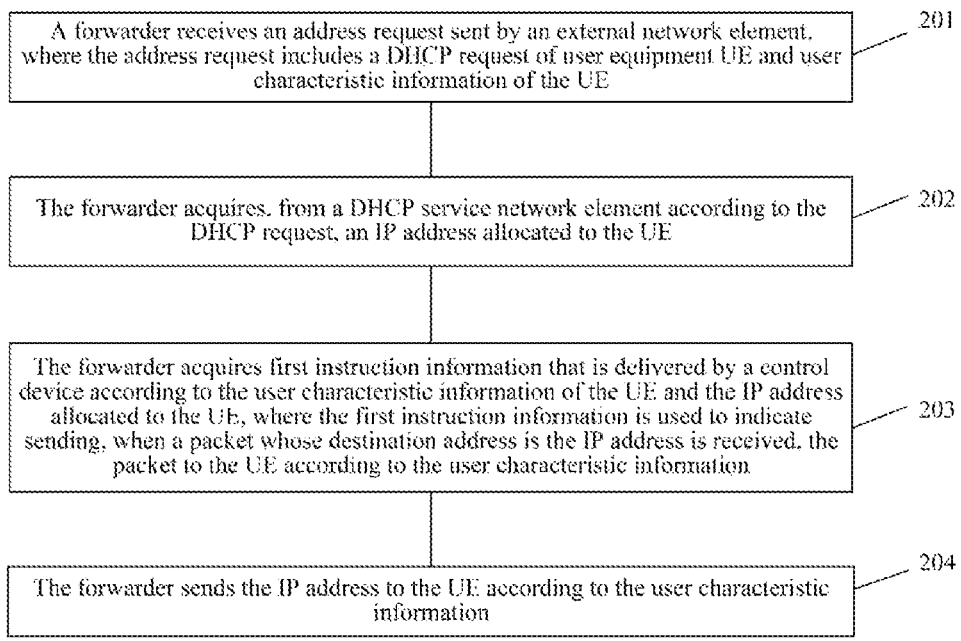
FIG. 2 is a schematic flowchart of an address allocation method according to an embodiment of the present disclosure.

Refer to FIG. 2, which shows an address allocation method provided in an embodiment of the present disclosure. The address allocation method is applied in a system in which a control plane is separated from a forwarding plane, and includes.

201. A forwarder receives an address request sent by an external network element, where the address request includes a DHCP request of UE and user characteristic information of the UE.

202. The forwarder acquires, from a DHCP service network element according to the DHCP request, an IP address allocated to the UE.

203. The forwarder acquires first instruction information that is delivered by a control device according to the user characteristic information of the UE and the IP address allocated to the UE, where the first instruction information is used to indicate sending, when a packet whose destination address is the IP address is received, the packet to the UE according to the user characteristic information, where the control device is a device controlling the forwarder.

204. The forwarder sends the IP address to the UE according to the user characteristic information.

Exemplarily, the acquiring, by the forwarder from a DHCP service network element according to the DHCP request, an IP address allocated to the UE specifically includes sending, by the forwarder, the DHCP request to the DHCP service network element, and receiving a DHCP request response sent by the DHCP service network element, where the DHCP request response includes the IP address allocated to the UE, and a destination address of the DHCP request response is the IP address allocated to the UE, and the sending, by the forwarder, the IP address to the UE according to the user characteristic information specifically includes sending, by the forwarder, the DHCP request response to the UE according to the first instruction information.

Optionally, the acquiring, by the forwarder from a DHCP service network element according to the DHCP request, an IP address allocated to the UE, and the acquiring, by the forwarder, first instruction information that is delivered by a control device according to the user characteristic information of the UE and the IP address allocated to the UE specifically include sending, by the forwarder, the DHCP request and the user characteristic information of the UE to the control device, where the control device supports a DHCP service, and receiving, by the forwarder, the IP address allocated to the UE and the first instruction information that are sent by the control device.

Optionally, the acquiring, by the forwarder from a DHCP service network element according to the DHCP request, an IP address allocated to the UE specifically includes sending, by the forwarder, the DHCP request to a DHCP server, and receiving, by the forwarder, the IP address allocated by the DHCP server to the UE, and the acquiring, by the forwarder, first instruction information that is delivered by a control device according to the user characteristic information of the UE and the IP address allocated to the UE specifically includes sending, by the forwarder, the IP address allocated to the UE and the user characteristic information of the UE to the control device, and receiving the first instruction information that is delivered by the control device according to the IP address allocated to the UE and the user characteristic information of the UE. Further, the sending, by the forwarder, the DHCP request to a DHCP server specifically includes sending, by the forwarder, the DHCP request to the control device, and receiving, by the forwarder, second instruction information sent by the control device, where the second instruction information is used to indicate forwarding, when the DHCP request is received, the DHCP request to the DHCP server, and the sending, by the forwarder, the DHCP request to a DHCP server specifically includes sending, by the forwarder, the DHCP request to the DHCP server according to the second instruction information by using the communications unit.

This embodiment provides an IP address allocation method, which implements, if a control plane is separated from a forwarding plane, a function that enables a user to acquire an IP address in a DHCP manner, and compared with other approaches, overcomes an disadvantage that a user cannot acquire an address in a DHCP manner in an SAE network architecture of SDN.

Figure 3:
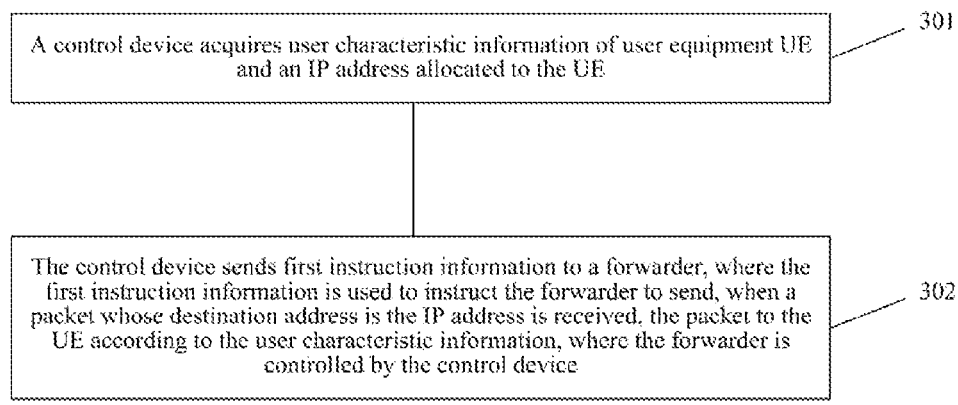
FIG. 3 is a schematic flowchart of another address allocation method according to an embodiment of the present disclosure.

Refer to FIG. 3, which shows another address allocation method provided in an embodiment of the present disclosure. The address allocation method is applied in a system in which a control plane is separated from a forwarding plane, and includes.

301. A control device acquires user characteristic information of UE and an IP address allocated to the UE.

Exemplarily, the acquiring, by a control device, user characteristic information of UE and an IP address allocated to the UE may specifically include receiving, by the control device, a DHCP request of the UE and the user characteristic information of the UE that are sent by a forwarder, where the control device supports a DHCP service, allocating, by the control device, the IP address to the UE, and delivering, by the control device according to the user characteristic information of the UE and the IP address allocated to the UE, the IP address allocated to the UE and first instruction information to the forwarder, or receiving, by the control device, the IP address allocated to the UE and the user characteristic information of the UE that are sent by a forwarder, and delivering first instruction information to the forwarder according to the IP address allocated to the UE and the user characteristic information of the UE. Further, the acquiring, by a control device, user characteristic information of UE and an IP address allocated to the UE may further specifically include receiving, by the control device, a DHCP request of the UE that is sent by the forwarder, and sending, by the control device, second instruction information to the forwarder, where the second instruction information is used to instruct the forwarder to forward, when the DHCP request is received, the DHCP request to a DHCP server.

302. The control device sends first instruction information to a forwarder, where the first instruction information is used to instruct the forwarder to send, when a packet whose destination address is the IP address is received, the packet to the UE according to the user characteristic information, where the forwarder is controlled by the control device.

This embodiment provides an IP address allocation method, which implements, if a control plane is separated from a forwarding plane, a function that enables a user to acquire an IP address in a DHCP manner, and compared with other approaches, overcomes an disadvantage that a user cannot acquire an address in a DHCP manner in an SAE network architecture of SDN.

Figure 4:
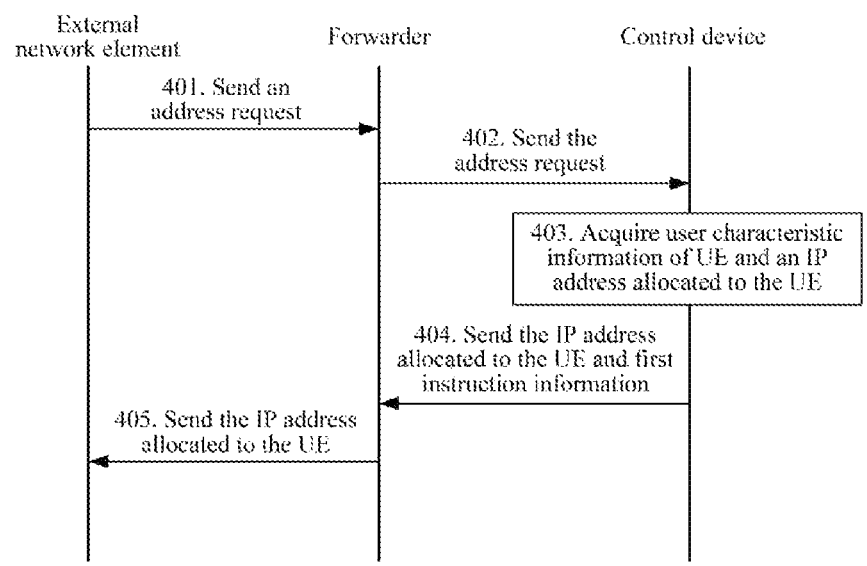
FIG. 4 is a schematic flowchart of a detailed embodiment of an address allocation method.

Based on the embodiments in FIG. 2 and FIG. 3, referring to FIG. 4, a detailed embodiment of an address allocation method is provided. This embodiment is characterized by that a DHCP service is integrated into a control device, and the control device may complete a DHCP address allocation function or a DHCP address allocation device may be directly connected to the control device. Specific steps are as follows.

401. An external network element sends an address request to a forwarder.

Exemplarily, the address request includes a DHCP request of UE and user characteristic information of the UE. Specifically, in this embodiment of the present disclosure, after the UE sends a DHCP request packet to an eNodeB, the eNodeB encapsulates the user characteristic information and the DHCP request packet of the UE into a GPRS Tunneling Protocol (GTP) packet, to obtain the address request. The user characteristic information is used to identify a user characteristic, and optionally includes, but is not limited to, tunnel endpoint identifier (TEID) information or a Media Access Control (MAC) address. Exemplarily, in this embodiment of the present disclosure, the TEID information is selected as the user characteristic information.

402. The forwarder sends the address request to a control device.

Exemplarily, after the forwarder receives the address request, because an uplink flow table related to the address request is not preinstalled, the forwarder cannot find, according to the address request, a corresponding flow table for matching, and therefore cannot process the address request. In this case, the forwarder may send all received packets that do not match any flow table to the control device, and the address request is sent to the control device in this manner.

Further, referring to Table 1, a flow table may include a matching field, a counter, and an instruction set, where the matching field is a 10-tuple, is an input keyword for packet matching, and may match 36 types of fields, which are used for header field matching, in data packet headers at five layers from an Ethernet layer to a transmission layer, the counter is used to collect statistical data of a flow entry, and the instruction set indicates an operation that should be performed on a data packet matching the flow entry, and the most basic operation behaviors include forwarding a packet to a port, forwarding a packet after encapsulating and rewriting the packet, and discarding a packet.

If a packet entering the forwarder has a field matching the matching field in the flow table, the forwarder performs an operation on the packet according to the instruction set in the flow table, if a packet entering the forwarder has no field matching the matching field in the flow table, the forwarder may send the packet to the control device. Generation, maintenance, and delivery of the flow table are completely implemented by the control device.

TABLE 1

| Flow table | Matching field | Counter | Instruction set |
| --- | --- | --- | --- |

Preferably, when the OPENFLOW protocol is used between the forwarder and the control device, the forwarder may send the address request to the control device by using a Packet-in message.

403. The control device acquires, according to the received address request, user characteristic information of UE and an IP address allocated to the UE.

Exemplarily, after receiving the Packet-in message sent by the forwarder, the control device performs GTP decapsulation on the message, to obtain the user characteristic information and the DHCP request packet of the UE, the control device hands over the DHCP request packet to a DHCP module, which is included in the control device, for processing, so that the DHCP module allocates the IP address to the UE according to the DHCP request packet, and encapsulates, into a DHCP request response, the IP address allocated to the UE. In addition, the control device further maintains a relationship between an IP address and user characteristic information, and specifically, the control device may maintain a correspondence between an IP address and user characteristic information in a form of a mapping table.

404. The control device sends the IP address allocated to the UE and first instruction information to the forwarder.

Exemplarily, the control device sends the DHCP request response including the IP address allocated to the UE and the first instruction information to the forwarder, where the first instruction information is used to instruct the forwarder to send, after a packet whose destination address is the IP address allocated to the UE is received, the packet to the UE according to the user characteristic information. Specifically, the first instruction information may include a downlink flow table on which matching is performed by using the IP address allocated to the UE, so that the forwarder can send a downlink packet to a user using the IP address allocated to the UE. The DHCP request response in this embodiment of the present disclosure belongs to a type of downlink packet.

It should be mentioned that the control device may further send an uplink flow table to the forwarder, and matching is performed on the uplink flow table according to the user characteristic information, because the IP address allocated to the UE corresponds to the user characteristic information, the uplink flow table enables the forwarder to process, according to the user characteristic information, an uplink packet sent by the UE that uses the IP address allocated to the UE.

405. The forwarder sends, to the UE according to the first indication information, the IP address allocated to the UE.

Exemplarily, the first instruction information includes the downlink flow table on which matching is performed by using the IP address allocated to the UE. The forwarder may encapsulate the DHCP request response and the user characteristic information together into a GTP packet according to the downlink flow table, and send the GTP packet to an eNodeB, and finally the eNodeB decapsulates the GTP packet, and then sends the DHCP request response to the UE according to the user characteristic information, so that the UE acquires the IP address, which is allocated to the UE, in the DHCP request response, thereby completing IP address allocation for the UE, and the UE can subsequently use the IP address allocated to the UE for communication.

This embodiment provides an IP address allocation method, which implements, if a control plane is separated from a forwarding plane, a function that enables a user to acquire an IP address in a DHCP manner, and compared with other approaches, overcomes an disadvantage that a user cannot acquire an address in a DHCP manner in an SAE network architecture of SDN.

Figure 5:
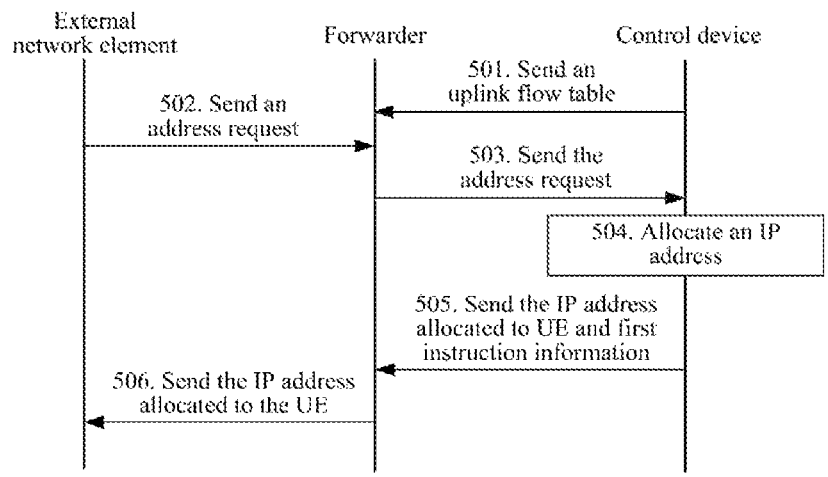
FIG. 5 is a schematic flowchart of another detailed embodiment of an address allocation method.

Based on the embodiments in FIG. 2 and FIG. 3, referring to FIG. 5, another detailed embodiment of an address allocation method is provided. Identical with the embodiment shown in FIG. 4, this embodiment is characterized by that a DHCP service is integrated into a control device, and the control device may complete a DHCP address allocation function or a DHCP address allocation device may be directly connected to the control device. Preferably, in this embodiment, the DHCP address allocation function is completed by the control device, and specific steps are as follows.

501. A control device sends an uplink flow table to a forwarder.

Exemplarily, in this embodiment, each address request sent by UE belongs to an uplink packet, therefore, the control device may send the uplink flow table to the forwarder in advance, so that the forwarder can correspondingly process an uplink packet according to the uplink flow table. In this embodiment, the uplink flow table may include that the forwarder decapsulates a GTP packet of an address request, and if it is found that a decapsulated GTP packet is a DHCP request packet, the DHCP request packet and TEID information in the GTP packet of the address request are sent together to the control device.

502. An external network element sends an address request to the forwarder.

Exemplarily, this embodiment is similar to the embodiment described in FIG. 4, and the address request is obtained by an eNodeB by encapsulating user characteristic information and the DHCP request packet of the UE into the GTP packet. The user characteristic information is used to identify a user characteristic, and optionally includes TEID information or a MAC address. Exemplarily, in this embodiment of the present disclosure, the TEID information is selected as the user characteristic information.

503. The forwarder sends the address request to the control device.

Exemplarily, after receiving the address request, the forwarder decapsulates the GTP packet of the address request according to the uplink flow table received in step 501, and if it is found that a decapsulated GTP packet is a DHCP request packet, the DHCP request packet and the TEID information in the GTP packet of the address request are sent together to the control device.

504. The control device allocates an IP address to UE.

Exemplarily, a DHCP module included in the control device may allocate a corresponding IP address to a UE side according to the received DHCP request packet, and encapsulate the corresponding IP address into a DHCP request response, and the control device may map the IP address allocated to the UE to the TEID information in a form of a mapping table.

505. The control device sends the IP address allocated to the UE and first instruction information to the forwarder.

Exemplarily, the control device sends the IP address allocated to the UE and the first instruction information to the forwarder, where the IP address allocated to the UE may be included in the DHCP request response. The first instruction information is used to instruct the forwarder to send, after a packet whose destination address is the IP address allocated to the UE is received, the packet to the UE according to the user characteristic information.

Specifically, the first instruction information may be indicated by using the downlink flow table on which matching is performed by using the IP address in step 404 of the embodiment in FIG. 4, or the control device may encapsulate the DHCP request response into an address response GTP packet, and send the address response GTP packet to the forwarder, where a TEID, which is included in a packet header, of the UE side is used as the first instruction information. In this embodiment, information obtained in the latter manner is selected as the first instruction information.

506. The forwarder sends, to a UE side according to the first instruction information, the IP address allocated to the UE.

Exemplarily, if the forwarder receives the address response GTP packet sent by the control device, the forwarder decapsulates the GTP packet to obtain the DHCP request response in the GTP packet, and directly sends, according to the TEID information included in the header of the address response GTP packet, the DHCP request response to the UE side corresponding to the TEID information, so that the UE side acquires the IP address allocated to the UE.

This embodiment provides an IP address allocation method, which implements, if a control plane is separated from a forwarding plane, a function that enables a user to acquire an IP address in a DHCP manner, and compared with other approaches, overcomes an disadvantage that a user cannot acquire an address in a DHCP manner in an SAE network architecture of SDN.

Figure 6:
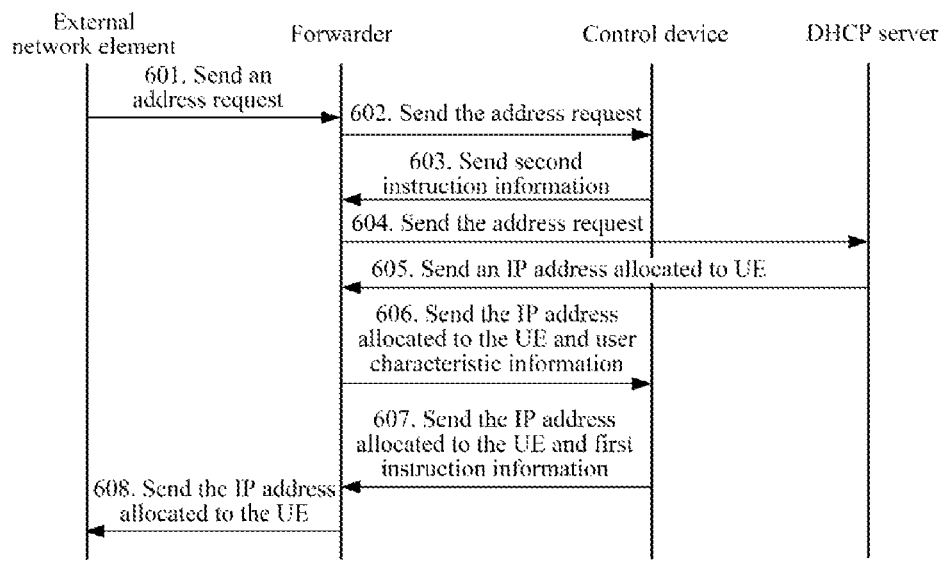
FIG. 6 is a schematic flowchart of a detailed embodiment of another address allocation method.

Based on the embodiments in FIG. 2 and FIG. 3, referring to FIG. 6, a detailed embodiment of another address allocation method is provided. This embodiment is specifically characterized by that a DHCP address allocation function is provided by a DHCP server outside a core network. Specific implementation steps are as follows.

601. An external network element sends an address request to a forwarder.

Exemplarily, similar to the embodiments in FIG. 4 and FIG. 5, the address request includes user characteristic information. Specifically, the address request sent by the external network element is obtained by an eNodeB by encapsulating a DHCP request packet of UE and the user characteristic information of the UE into a GTP packet. The user characteristic information is used to identify a user characteristic, and optionally includes TEID information or a MAC address. Preferably, in this embodiment, the TEID information is selected as the user characteristic information.

602. The forwarder sends the address request to a control device.

Exemplarily, because an uplink flow table related to the address request is not preinstalled on the forwarder, the forwarder cannot find, according to the address request, a corresponding flow table for matching, and therefore cannot process the address request. In this case, the forwarder may send all received packets that do not match any flow table to the control device, and the address request is sent to the control device in this manner.

603. The control device acquires, according to the received address request, user characteristic information of UE and sends second instruction information to the forwarder.

Exemplarily, the second instruction information may be specifically an uplink flow table sent by the control device to the forwarder, so that the forwarder can process the address request according to the uplink flow table.

Specifically, after receiving the address request sent by the forwarder, the control device establishes an uplink flow table according to the DHCP request packet in the address request, so that the forwarder can send the DHCP request packet to a DHCP server according to the uplink flow table.

604. The forwarder sends the address request to a DHCP server according to the second instruction information.

Exemplarily, in this embodiment, the forwarder may decapsulate the GTP packet of the address request according to the uplink flow table used as the second instruction information, and send the DHCP request packet to the DHCP server.

605. The DHCP server sends, to the forwarder, an IP address allocated to the UE.

Exemplarily, after receiving the DHCP request packet, the DHCP server allocates a corresponding IP address to a UE side, and the DHCP server encapsulates, into a DHCP request response, the IP address allocated to the UE, and sends the DHCP request response to the forwarder.

606. The forwarder sends the IP address allocated to the UE and the user characteristic information to the control device.

Exemplarily, because there is no corresponding downlink flow table, similar to step 602, the forwarder sends the received DHCP request response that does not match any flow table to the control device for processing, and in order to enable the control device to identify information about the UE side to which the IP address is allocated, the forwarder sends the DHCP request response and the corresponding user characteristic information together to the control device, so that the control device delivers first instruction information to the forwarder according to the IP address allocated to the UE and the user characteristic information.

607. The control device sends the IP address allocated to the UE and first instruction information to the forwarder.

Exemplarily, the control device maps the IP address, which is allocated to the UE, in the received DHCP request response to the user characteristic information in a form of a mapping table, to generate the first instruction information, where the first instruction information is used to instruct the forwarder to send, after a packet whose destination address is the IP address allocated to the UE is received, the packet to the UE according to the user characteristic information.

Specifically, the first instruction information may include a downlink flow table on which matching is performed by using the IP address allocated to the UE, so that the forwarder can send a downlink packet to a user using the IP address allocated to the UE. The DHCP request response in this embodiment of the present disclosure belongs to a type of downlink packet.

608. The forwarder sends, to a UE side according to the first instruction information, the IP address allocated to the UE.

Exemplarily, similar to step 405, the forwarder may encapsulate the DHCP request response and the user characteristic information together into a GTP packet according to the downlink flow table, and send the GTP packet to an eNodeB, and finally the eNodeB decapsulates the GTP packet, and then sends the DHCP request response to the UE according to the user characteristic information, so that the UE acquires the IP address, which is allocated to the UE, in the DHCP request response, thereby completing IP address allocation for the UE, and the UE can subsequently use the IP address allocated to the UE for communication.

This embodiment provides an IP address allocation method, which implements, if a control plane is separated from a forwarding plane, a function that enables a user to acquire an IP address in a DHCP manner, and compared with other approaches, overcomes a disadvantage that a user cannot acquire an address in a DHCP manner in an SAE network architecture of SDN.

Figure 7:
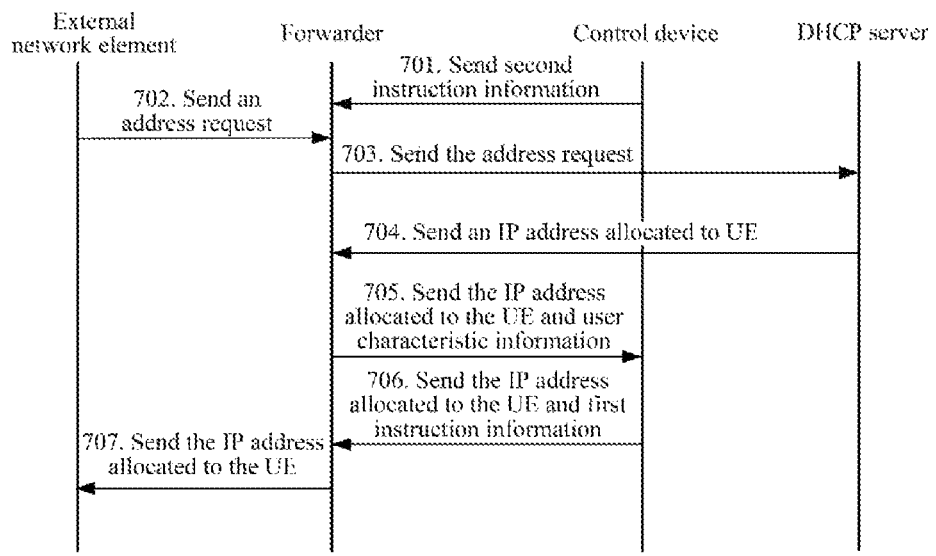
FIG. 7 is a schematic flowchart of another detailed embodiment of another address allocation method.

Based on the embodiments in FIG. 2 and FIG. 3, referring to FIG. 7, another detailed embodiment of another address allocation method is provided. Identical with the embodiment shown in FIG. 6, this embodiment is characterized by that a DHCP address allocation function is provided by a DHCP server outside a core network. Specific steps are as follows.

701. A control device sends second instruction information to a forwarder in advance.

Exemplarily, the control device sends the second instruction information to the forwarder in advance, where the second instruction information includes an uplink flow table, so that the forwarder can process an uplink packet sent by a user. Exemplarily, an address request sent by UE belongs to a type of uplink packet.

702. An external network element sends an address request to the forwarder.

Exemplarily, similar to step 601 in the foregoing embodiment, the address request includes a DHCP request of the UE and user characteristic information of the UE, where the user characteristic information is used to identify a user characteristic, and optionally includes TEID information or a MAC address. Preferably, in this embodiment, the TEID information is selected as the user characteristic information.

Specifically, the address request sent by the external network element is obtained by an eNodeB by encapsulating a DHCP request packet of the UE and the user characteristic information of the UE into a GTP packet.

703. The forwarder sends the address request to a DHCP server according to the second instruction information.

Exemplarily, because the uplink flow table is preinstalled on the forwarder, the forwarder can process the received address request, and the forwarder may decapsulate the GTP packet of the address request according to the uplink flow table, and send the DHCP request packet to the DHCP server.

704. The DHCP server sends, to the forwarder, an IP address allocated to the UE.

Similar to step 605 in the foregoing embodiment, after receiving the DHCP request packet, the DHCP server allocates a corresponding IP address to the UE, and the DHCP server encapsulates, into a DHCP request response, the IP address allocated to the UE, and sends the DHCP request response to the forwarder.

705. The forwarder sends the IP address allocated to the UE and the user characteristic information to the control device.

Similar to step 606 in the foregoing embodiment, because there is no corresponding downlink flow table, the forwarder sends the received DHCP request response that does not match any flow table to the control device for processing, and in order to enable the control device to identify information about a UE side to which the IP address is allocated, the forwarder sends the DHCP request response and the corresponding user characteristic information together to the control device, so that the control device delivers first instruction information to the forwarder according to the IP address allocated to the UE and the user characteristic information.

706. The control device sends the IP address allocated to the UE and first instruction information to the forwarder.

Exemplarily, similar to step 607 in the foregoing embodiment, the control device maps the IP address, which is allocated to the UE, in the received DHCP request response to the user characteristic information in a form of a mapping table, to generate the first instruction information, where the first instruction information is used to instruct the forwarder to send, after a packet whose destination address is the IP address allocated to the UE is received, the packet to the UE according to the user characteristic information.

Specifically, the first instruction information may include a downlink flow table on which matching is performed by using the IP address, so that the forwarder can send a downlink packet to a user using the IP address allocated to the UE. The DHCP request response in this embodiment of the present disclosure belongs to a type of downlink packet.

707. The forwarder sends, to a UE side according to the first instruction information, the IP address allocated to the UE.

Exemplarily, similar to step 608 in the foregoing embodiment, the forwarder may encapsulate the DHCP request response and the user characteristic information together into a GTP packet according to the downlink flow table, and send the GTP packet to an eNodeB, and finally the eNodeB decapsulates the GTP packet, and then sends the DHCP request response to the UE according to the user characteristic information, so that the UE acquires the IP address, which is allocated to the UE, in the DHCP request response, thereby completing IP address allocation for the UE, and the UE can subsequently use the IP address for communication.

This embodiment provides an IP address allocation method, which implements, if a control plane is separated from a forwarding plane, a function that enables a user to acquire an IP address in a DHCP manner, and compared with other approaches, overcomes a disadvantage that a user cannot acquire an address in a DHCP manner in an SAE network architecture of SDN.

Figure 8:
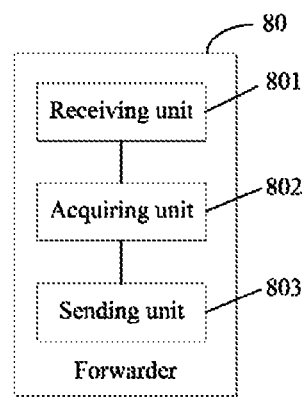
FIG. 8 is a schematic structural diagram of a forwarder according to an embodiment of the present disclosure.

An embodiment of the present disclosure provides a forwarder 80, applied in a system in which a control plane of SDN is separated from a forwarding plane. A specific form of the forwarder is not specifically limited in this embodiment of the present disclosure, and the forwarder may be separate, or may be combined together with a control device. As shown in FIG. 8, the forwarder 80 includes a receiving unit 801, configured to receive an address request sent by an external network element, where the address request includes a DHCP request of UE and user characteristic information of the UE, an acquiring unit 802, configured to acquire, from a DHCP service network element according to the DHCP request, an IP address allocated to the UE, where the acquiring unit 802 is further configured to acquire first instruction information that is delivered by a control device according to the user characteristic information of the UE and the IP address allocated to the UE, where the first instruction information is used to indicate sending, when a packet whose destination address is the IP address allocated to the UE is received, the packet to the UE according to the user characteristic information, where the control device is a device controlling the forwarder, and a sending unit 803, configured to send, to the UE according to the user characteristic information, the IP address allocated to the UE.

Exemplarily, in this embodiment of the present disclosure, after the UE sends a DHCP request packet to an eNodeB, the eNodeB encapsulates the user characteristic information and the DHCP request packet into a GTP packet, to obtain the address request. The user characteristic information is used to identify a user characteristic, and optionally includes TEID information or a MAC address. Exemplarily, in this embodiment of the present disclosure, the TEID information is selected as the user characteristic information.

Exemplarily, the acquiring unit 802 is further configured to send the DHCP request to the DHCP service network element, and receive a DHCP request response sent by the DHCP service network element, where the DHCP request response includes the IP address allocated to the UE, and a destination address of the DHCP request response is the IP address allocated to the UE, and the sending unit 803 may be further configured to send the DHCP request response to the UE according to the first instruction information.

Optionally, the first instruction information may include a downlink flow table on which matching is performed by using the IP address. The sending unit 803 may encapsulate the DHCP request response and the user characteristic information together into a GTP packet according to the downlink flow table, and send the GTP packet to an eNodeB, and finally the eNodeB decapsulates the GTP packet, and then sends the DHCP request response to the UE according to the user characteristic information, so that the UE acquires the IP address, which is allocated to the UE, in the DHCP request response, thereby completing IP address allocation for the UE.

Further, as shown in Table 1, a flow table may include a matching field, a counter, and an instruction set, where the matching field is a 10-tuple, is an input keyword for packet matching, and may match 36 types of fields, which are used for header field matching, in data packet headers at five layers from an Ethernet layer to a transmission layer, the counter is used to collect statistical data of a flow entry, and the instruction set indicates an operation that should be performed on a data packet matching the flow entry, and the most basic operation behaviors include forwarding a packet to a port, forwarding a packet after encapsulating and rewriting the packet, and discarding a packet.

If a packet entering the forwarder 80 has a field matching the matching field in the flow table, the forwarder 80 performs an operation on the packet according to the instruction set in the flow table, if a packet entering the forwarder 80 has no field matching the matching field in the flow table, the forwarder 80 may send the packet to the control device. Generation, maintenance, and delivery of the flow table are completely implemented by the control device.

Optionally, the first instruction information may also be a packet header including a TEID of the UE when the control device encapsulates the DHCP request response into an address response GTP packet, so that the sending unit 803 sends the address response GTP packet to the corresponding UE according to the packet header including the TEID of the UE.

Figure 9:
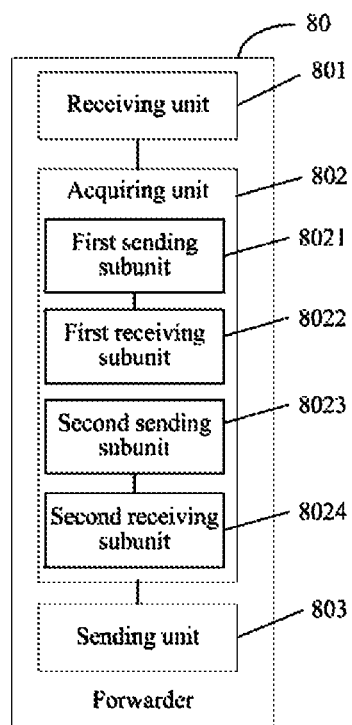
FIG. 9 is a schematic structural diagram of another forwarder according to an embodiment of the present disclosure.

Exemplarily, referring to FIG. 9, the acquiring unit 802 may include a first sending subunit 8021, configured to send the DHCP request and the user characteristic information of the UE to the control device, where the control device supports a DHCP service, and a first receiving subunit 8022, configured to receive the IP address allocated to the UE and the first instruction information that are sent by the control device.

Specifically, the first sending subunit 8021 may send the DHCP request and the user characteristic information of the UE to the control device after the forwarder 80 receives the address request, and because an uplink flow table related to the address request is not preinstalled, the forwarder 80 cannot find, according to the address request, a corresponding flow table for matching, and therefore cannot process the address request, and in this case, the forwarder 80 may send all received packets that do not match any flow table to the control device, and the address request is sent to the control device in this manner, or the first sending subunit 8021 may send the DHCP request and the user characteristic information of the UE to the control device after the control device sends an uplink flow table to the forwarder 80 in advance, so that the first sending subunit 8021 can correspondingly process an uplink packet according to the uplink flow table, and in this embodiment, the uplink flow table may include that the forwarder 80 decapsulates a GTP packet of the address request, and if it is found that a decapsulated GTP packet is a DHCP request packet, the DHCP request packet and the TEID information in the GTP packet of the address request are sent together to the control device.

Exemplarily, referring to FIG. 9, the acquiring unit 802 may also include a second sending subunit 8023, configured to send the DHCP request to a DHCP server, and a second receiving subunit 8024, configured to receive the IP address that is allocated to the UE and is sent by the DHCP server, where the second sending subunit 8023 is further configured to send the IP address allocated to the UE and the user characteristic information of the UE to the control device, so that the control device delivers the first instruction information to the forwarder 80 according to the IP address allocated to the UE and the user characteristic information.

Further, before the second sending subunit 8023 sends, to the DHCP server, the request for acquiring an address of the UE, the sending unit 803 is further configured to send the DHCP request of the UE to the control device, and the receiving unit 801 is further configured to receive second instruction information sent by the control device, where the second instruction information is used to indicate forwarding, when the address request of the UE is received, the DHCP request to the DHCP server.

Specifically, the second instruction information may be an uplink flow table sent by the control device to the forwarder

80, so that the forwarder 80 can process the address request according to the uplink flow table.

Optionally, after the sending unit 803 sends the address request of the UE to the control device, the receiving unit 801 receives the second instruction information sent by the control device. In this embodiment, the second instruction information is an uplink flow table that is established by the control device according to the DHCP request packet in the address request, so that the forwarder 80 can send the DHCP request packet to the DHCP server according to the uplink flow table.

Optionally, the receiving unit 801 may also receive, in advance, the second instruction information sent by the control device, where the second instruction information includes an uplink flow table, so that the forwarder 80 can process an uplink packet sent by a user, and in this embodiment, the address request sent by the UE belongs to a type of uplink packet.

The sending unit 803 is further configured to send the DHCP request of the UE to the DHCP server according to the second instruction information.

Specifically, the sending unit 803 may decapsulate the GTP packet of the address request according to the uplink flow table in the second instruction information, and send the DHCP request packet to the DHCP server.

Exemplarily, the second sending subunit 8023 is further configured to send the IP address allocated to the UE and the user characteristic information to the control device. Specifically, because there is no corresponding downlink flow table, the forwarder 80 sends the received DHCP request response that does not match any flow table to the control device for processing, and in order to enable the control device to identify information about a UE side to which the IP address is allocated, the forwarder 80 sends the DHCP request response and the corresponding user characteristic information together to the control device, so that the control device generates the first instruction information according to the IP address allocated to the UE and the user characteristic information, and the forwarder 80 forwards the IP address allocated to the UE to the corresponding UE.

This embodiment provides a forwarder 80, which implements, if a control plane is separated from a forwarding plane, a function that enables a user to acquire an IP address in a DHCP manner, and compared with other approaches, overcomes a disadvantage that a user cannot acquire an address in a DHCP manner in an SAE network architecture of SDN.

Figure 10:
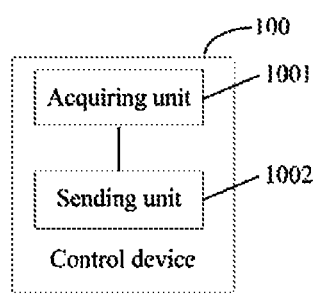
FIG. 10 is a schematic structural diagram of a control device according to an embodiment of the present disclosure.

An embodiment of the present disclosure provides a control device 100, applied in a system in which a control plane of SDN is separated from a forwarding plane. A specific form of the control device is not specifically limited in this embodiment of the present disclosure, and the control device may be separate, or may be combined together with a forwarder. As shown in FIG. 10, the control device 100 may include an acquiring unit 1001, configured to acquire user characteristic information of UE and an IP address allocated to the UE, and a sending unit 1002, configured to send first instruction information to a forwarder, where the first instruction information is used to instruct the forwarder to send, when a packet whose destination address is the IP address is received, the packet to the UE according to the user characteristic information, where the forwarder is controlled by the control device 100.

Exemplarily, the user characteristic information is used to identify a user characteristic, and optionally includes TEID information or a MAC address. Exemplarily, in this embodiment of the present disclosure, the TEID information is selected as the user characteristic information.

Exemplarily, the IP address allocated to the UE may be included in a DHCP request response. A specific form of the first instruction information may include a downlink flow table on which matching is performed by using the IP address, so that the forwarder can send a downlink packet to a user using the IP address allocated to the UE, or the control device 100 encapsulates the DHCP request response into an address response GTP packet, and sends the address response GTP packet to the forwarder, where a TEID, which is included in a packet header, of the UE is used as the first instruction information.

Further, as shown in Table 1, a flow table may include a matching field, a counter, and an instruction set, where the matching field is a 10-tuple, is an input keyword for packet matching, and may match 36 types of fields, which are used for header field matching, in data packet headers at five layers from an Ethernet layer to a transmission layer, the counter is used to collect statistical data of a flow entry, and the instruction set indicates an operation that should be performed on a data packet matching the flow entry, and the most basic operation behaviors include forwarding a packet to a port, forwarding a packet after encapsulating and rewriting the packet, and discarding a packet.

If a packet entering the forwarder has a field matching the matching field in the flow table, the forwarder performs an operation on the packet according to the instruction set in the flow table, if a packet entering the forwarder has no field matching the matching field in the flow table, the forwarder may send the packet to the control device 100. Generation, maintenance, and delivery of the flow table are completely implemented by the control device 100.

Figure 11:
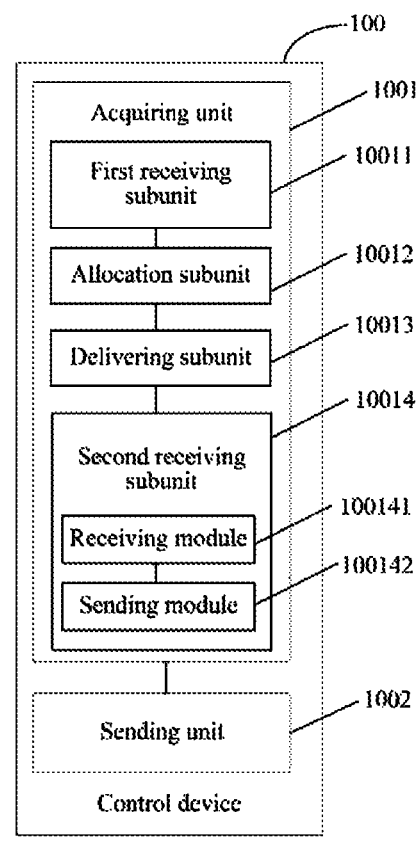
FIG. 11 is a schematic structural diagram of another control device according to an embodiment of the present disclosure.

Exemplarily, referring to FIG. 11, the acquiring unit 1001 may include a first receiving subunit 10011, configured to receive a DHCP request of the UE and the user characteristic information of the UE that are sent by the forwarder, where the control device supports a DHCP service, and the user characteristic information in this embodiment is a TEID, an allocation subunit 10012, configured to allocate the IP address to the UE, where specifically, after the allocation subunit 10012 allocates the IP address to the UE, the control device 100 may map the IP address allocated to the UE to the TEID information in a form of a mapping table, and a delivering subunit 10013, configured to deliver the IP address allocated to the UE and the first instruction information to the forwarder according to the user characteristic information of the UE and the IP address allocated to the UE.

Exemplarily, referring to FIG. 11, the acquiring unit 1001 may further include a second receiving subunit 10014, configured to receive the IP address allocated to the UE and the user characteristic information of the UE that are sent by the forwarder, and deliver the first instruction information to the forwarder according to the IP address allocated to the UE and the user characteristic information of the UE.

Specifically, the second receiving subunit 10014 may include a receiving module 100141, configured to receive a DHCP request of the UE that is sent by the forwarder, and a sending module 100142, configured to send second instruction information to the forwarder, where the second instruction information is used to instruct the forwarder to forward, when the DHCP request is received, the DHCP request to a DHCP server.

Exemplarily, the second instruction information may be specifically an uplink flow table sent by the control device 100 to the forwarder, so that the forwarder can process the address request according to the uplink flow table, where the second instruction information may be preinstalled on the forwarder, or the uplink flow table may be established as the second instruction information according to a DHCP request packet in the address request after the receiving module 100141 receives the address request sent by the forwarder, which is not limited in this embodiment.

This embodiment provides a control device 100, which implements, if a control plane is separated from a forwarding plane, a function that enables a user to acquire an IP address in a DHCP manner, and compared with other approaches, overcomes a disadvantage that a user cannot acquire an address in a DHCP manner in an SAE network architecture of SDN.

Figure 12:
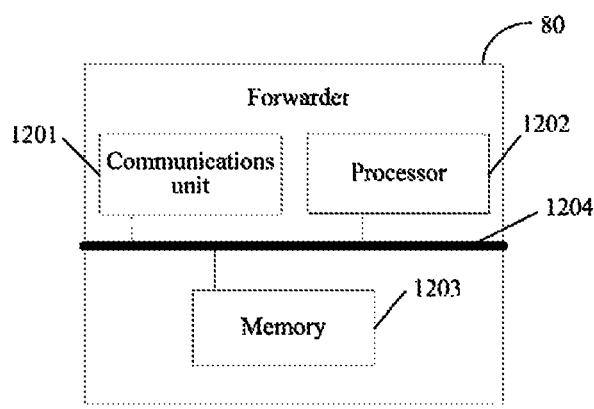
FIG. 12 is a schematic apparatus diagram of a forwarder according to an embodiment of the present disclosure.

An embodiment of the present disclosure provides a forwarder 80, applied in a system in which a control plane of SDN is separated from a forwarding plane. A specific form of the forwarder is not specifically limited in this embodiment of the present disclosure, and is subject to a forwarder that can implement any IP address allocation method provided in the embodiments of the present disclosure. Referring to FIG. 12, the forwarder includes at least one communications unit 1201, a processor 1202, a memory 1203, and a bus 1204, where the at least one communications unit 1201, the processor 1202, and the memory 1203 are connected and communicate with each other by using the bus 1204.

The bus 1204 may be an industry standard architecture (ISA) bus, a Peripheral Component Interconnect (PCI) bus, or an Extended Industry Standard Architecture (EISA) bus. The bus 1204 may be classified into an address bus, a data bus, a control bus, and the like. For ease of indication, in FIG. 12, the bus is indicated by using only one thick line, which does not indicate that there is only one bus or one type of bus.

The memory 1203 is configured to store executable program code, where the program code includes a computer operation instruction. The memory 1203 may include a high-speed random-access memory (RAM) memory, and may further include a non-volatile memory, such as at least one magnetic disk storage. A storage device stores an operating system and an application program, which are configured to implement the program code in this embodiment of the present disclosure. The operating system is configured to control and implement a processing function executed by a processing unit. The application program includes the program code, such as word processing software and email software.

The processor 1202 may be a central processing unit (CPU) or an application-specific integrated circuit (ASIC), or may be configured as one or more integrated circuits implementing this embodiment of the present disclosure.

The communications unit 1201 is configured to communicate with an external network element, and the processor 1202 is configured to receive, by using the communications unit 1201, an address request sent by the external network element, where the address request includes a DHCP request of UE and user characteristic information of the UE, acquire, from a DHCP service network element according to the DHCP request, an IP address allocated to the UE, acquire, by using the communications unit 1201, first instruction information that is delivered by a control device according to the user characteristic information of the UE and the IP address allocated to the UE, where the first instruction information is used to indicate sending, when a packet whose destination address is the IP address allocated to the UE is received, the packet to the UE according to the user characteristic information, where the control device is a device controlling the forwarder 80, and send, to the UE according to the user characteristic information by using the communications unit 1201, the IP address allocated to the UE.

Exemplarily, in this embodiment of the present disclosure, after the UE sends a DHCP request packet to an eNodeB, the eNodeB encapsulates the user characteristic information and the DHCP request packet into a GTP packet, to obtain the address request. The user characteristic information is used to identify a user characteristic, and optionally includes TEID information or a MAC address. Exemplarily, in this embodiment of the present disclosure, the TEID information is selected as the user characteristic information.

Exemplarily, the processor 1202 is further configured to send the DHCP request to the DHCP service network element, and receive a DHCP request response sent by the DHCP service network element, where the DHCP request response includes the IP address allocated to the UE, and a destination address of the DHCP request response is the IP address allocated to the UE, and the processor 1202 sends the DHCP request response to the UE according to the first instruction information by using the communications unit 1201.

Optionally, the first instruction information may include a downlink flow table on which matching is performed by using the IP address. The processor 1202 may encapsulate the DHCP request response and a TEID together into a GTP packet according to the downlink flow table, and send the GTP packet to an eNodeB by using the communications unit 1201, and finally the eNodeB decapsulates the GTP packet, and then sends the DHCP request response to the UE according to the TEID, so that the UE acquires the IP address, which is allocated to the UE, in the DHCP request response, thereby completing IP address allocation for the UE.

As shown in Table 1, a flow table may include a matching field, a counter, and an instruction set, where the matching field is a 10-tuple, is an input keyword for packet matching, and may match 36 types of fields, which are used for header field matching, in data packet headers at five layers from an Ethernet layer to a transmission layer, the counter is used to collect statistical data of a flow entry, and the instruction set indicates an operation that should be performed on a data packet matching the flow entry, and the most basic operation behaviors include forwarding a packet to a port, forwarding a packet after encapsulating and rewriting the packet, and discarding a packet.

If a packet entering the forwarder 80 has a field matching the matching field in the flow table, the forwarder 80 performs an operation on the packet according to the instruction set in the flow table, if a packet entering the forwarder 80 has no field matching the matching field in the flow table, the forwarder 80 may send the packet to the control device. Generation, maintenance, and delivery of the flow table are completely implemented by the control device.

Optionally, the first instruction information may also be a packet header including a TEID of the UE when the control device encapsulates the DHCP request response into an address response GTP packet, so that the processor 1202 sends, by using the communications unit 1201, the address response GTP packet to the corresponding UE according to the packet header including the TEID of the UE.

Exemplarily, that the processor 1202 acquires, from a DHCP service network element according to the DHCP request, an IP address allocated to the UE may include the processor 1202 is configured to send the DHCP request and the user characteristic information of the UE to the control device by using the communications unit 1201, where the control device supports a DHCP service, and receive, by using the communications unit 1201, the IP address allocated to the UE and the first instruction information that are sent by the control device.

Further, the processor 1202 may send the DHCP request and the user characteristic information of the UE to the control device by using the communications unit 1201 after the forwarder 80 receives the address request, and because an uplink flow table related to the address request is not preinstalled, the forwarder 80 cannot find, according to the address request, a corresponding flow table for matching, and therefore cannot process the address request, and in this case, the forwarder 80 may send all received packets that do not match any flow table to the control device, and the address request is sent to the control device in this manner, or the processor 1202 may send the DHCP request and the user characteristic information of the UE to the control device by using the communications unit 1201 after the control device sends an uplink flow table to the forwarder 80 in advance, so that the processor 1202 can correspondingly process an uplink packet according to the uplink flow table, and in this embodiment, the uplink flow table may include that the forwarder 80 decapsulates a GTP packet of the address request, and if it is found that a decapsulated GTP packet is a DHCP request packet, the DHCP request packet and the TEID information in the GTP packet of the address request are sent together to the control device.

Exemplarily, that the processor 1202 acquires, from a DHCP service network element according to the DHCP request, an IP address allocated to the UE may also include the processor is configured to send the DHCP request to a DHCP server by using the communications unit 1201, and receive, by using the communications unit 1201, the IP address that is allocated to the UE and is sent by the DHCP server, and the processor 1202 is further configured to send the IP address allocated to the UE and the user characteristic information of the UE to the control device by using the communications unit 1201, so that the control device delivers the first instruction information to the forwarder 80 according to the IP address allocated to the UE and the user characteristic information.

Further, before the processor 1202 sends, to the DHCP server by using the communications unit 1201, the request for acquiring an address of the UE, the processor 1202 is further configured to send the DHCP request of the UE to the control device by using the communications unit 1201, and receive, by using the communications unit 1201, second instruction information sent by the control device, where the second instruction information is used to indicate forwarding, when the address request of the UE is received, the DHCP request of the UE to the DHCP server.

Specifically, the second instruction information may be an uplink flow table sent by the control device to the forwarder 80, so that the forwarder 80 can process the address request according to the uplink flow table.

Optionally, after sending the address request of the UE to the control device by using the communications unit 1201, the processor 1202 may receive, by using the communications unit 1201, the second instruction information sent by the control device, and in this case, the second instruction information is an uplink flow table that is established by the control device according to the DHCP request packet in the address request, so that the forwarder 80 can send the DHCP request packet to the DHCP server according to the uplink flow table.

Optionally, the processor 1202 may also receive, in advance by using the communications unit 1201, the second instruction information sent by the control device, where the second instruction information includes an uplink flow table, so that the forwarder 80 can process an uplink packet sent by a user, and in this embodiment, the address request sent by the UE belongs to a type of uplink packet.

Exemplarily, the processor 1202 may be configured to send the DHCP request of the UE to the DHCP server according to the second instruction information by using the communications unit 1201. Specifically, the processor 1202 may decapsulate the GTP packet of the address request according to the uplink flow table in the second instruction information, and send the DHCP request packet to the DHCP server.

Exemplarily, the processor 1202 sends, by using the communications unit 1201, the IP address allocated to the UE and the user characteristic information to the control device. Specifically, because there is no corresponding downlink flow table, the forwarder 80 sends the received DHCP request response that does not match any flow table to the control device for processing, and in order to enable the control device to identify information about a UE side to which the IP address is allocated, the forwarder 80 sends the DHCP request response and the corresponding user characteristic information together to the control device, so that the control device generates the first instruction information according to the IP address allocated to the UE and the TEID, and the forwarder 80 forwards the IP address allocated to the UE to the corresponding UE.

This embodiment provides a forwarder 80, which implements, if a control plane is separated from a forwarding plane, a function that enables a user to acquire an IP address in a DHCP manner, and compared with other approaches, overcomes a disadvantage that a user cannot acquire an address in a DHCP manner in an SAE network architecture of SDN.

Figure 13:
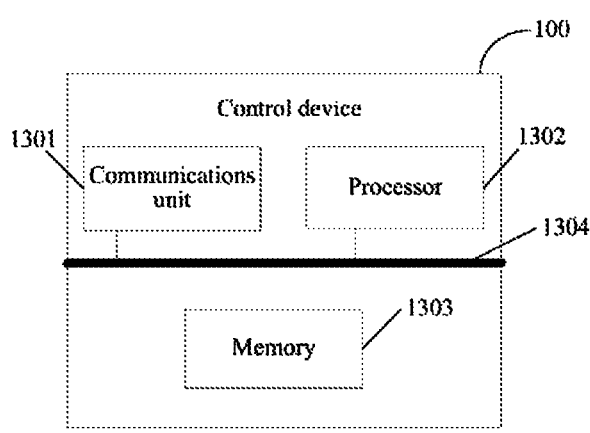
FIG. 13 is a schematic apparatus diagram of a control device according to an embodiment of the present disclosure.

An embodiment of the present disclosure provides a control device 100, applied in a system in which a control plane of SDN is separated from a forwarding plane. A specific form of the control device 100 is not specifically limited in this embodiment of the present disclosure, and the control device may be separate, or may be combined together with a forwarder. As shown in FIG. 13, the control device 100 may include at least one communications unit 1301, a processor 1302, a memory 1303, and a bus 1304, where the at least one communications unit 1301, the processor 1302, and the memory 1303 are connected and communicate with each other by using the bus 1304.

The bus 1304 may be an ISA bus, a PCI bus, or an EISA bus. The bus 1304 may be classified into an address bus, a data bus, a control bus, and the like. For ease of indication, in FIG. 12, the bus is indicated by using only one thick line, which does not indicate that there is only one bus or one type of bus.

The memory 1303 is configured to store executable program code, where the program code includes a computer operation instruction. The memory 1303 may include a high-speed RAM memory, and may further include a non-volatile memory, such as at least one magnetic disk storage. A storage device stores an operating system and an application program, which are configured to implement the program code in this embodiment of the present disclosure. The operating system is configured to control and implement a processing function executed by a processing unit. The application program includes the program code, such as word processing software and email software.

The processor 1302 may be a CPU or an ASIC, or may be configured as one or more integrated circuits implementing this embodiment of the present disclosure.

The communications unit 1301 is configured to communicate with an external network element, and the processor 1302 is configured to acquire user characteristic information of UE and an IP address allocated to the UE, and send first instruction information to a forwarder by using the communications unit 1301, where the first instruction information is used to indicate sending, when a packet whose destination address is the IP address is received, the packet to the UE according to the user characteristic information, where the forwarder is controlled by the control device 100.

Exemplarily, the user characteristic information is used to identify a user characteristic, and optionally includes TEID information or a MAC address. Exemplarily, in this embodiment of the present disclosure, the TEID information is selected as the user characteristic information.

Exemplarily, the IP address allocated to the UE may be included in a DHCP request response. The first instruction information may specifically include a downlink flow table on which matching is performed by using the IP address, so that the forwarder can send a downlink packet to a user using the IP address allocated to the UE, or the control device 100 encapsulates the DHCP request response into an address response GTP packet, and sends the address response GTP packet to the forwarder, where a TEID, which is included in a packet header, of a UE side is used as the first instruction information.

Further, as shown in Table 1, a flow table may include a matching field, a counter, and an instruction set, where the matching field is a 10-tuple, is an input keyword for packet matching, and may match 36 types of fields, which are used for header field matching, in data packet headers at five layers from an Ethernet layer to a transmission layer, the counter is used to collect statistical data of a flow entry, and the instruction set indicates an operation that should be performed on a data packet matching the flow entry, and the most basic operation behaviors include forwarding a packet to a port, forwarding a packet after encapsulating and rewriting the packet, and discarding a packet.

If a packet entering the forwarder has a field matching the matching field in the flow table, the forwarder performs an operation on the packet according to the instruction set in the flow table, if a packet entering the forwarder has no field matching the matching field in the flow table, the forwarder may send the packet to the control device 100. Generation, maintenance, and delivery of the flow table are completely implemented by the control device 100.

Exemplarily, that the processor 1302 is configured to acquire user characteristic information of UE and an IP address allocated to the UE specifically includes the processor 1302 is configured to receive, by using the communications unit 1301, a DHCP request of the UE and the user characteristic information of the UE that are sent by the forwarder, where the control device supports a DHCP service, and the user characteristic information in this embodiment is a TEID, allocate the IP address to the UE, where specifically, after allocating the IP address to the UE, the processor 1302 may map the IP address allocated to the UE to the TEID information in a form of a mapping table, and deliver the IP address allocated to the UE and the first instruction information to the forwarder according to the user characteristic information of the UE and the IP address allocated to the UE.

Exemplarily, that the processor 1302 is configured to acquire user characteristic information of UE and an IP address allocated to the UE specifically includes receiving, by the processor 1302 by using the communications unit 1301, the IP address allocated to the UE and the user characteristic information of the UE that are sent by the forwarder, and delivering the first instruction information to the forwarder according to the IP address allocated to the UE and the user characteristic information of the UE.

Further, the processor 1302 is further configured to receive, by using the communications unit 1301, a DHCP request of the UE that is sent by the forwarder, and send second instruction information to the forwarder by using the communications unit 1301, where the second instruction information is used to instruct the forwarder to forward, when the DHCP request is received, the DHCP request to a DHCP server.

Exemplarily, the second instruction information may be specifically an uplink flow table sent by the control device 100 to the forwarder, so that the forwarder can process an address request according to the uplink flow table, where the second instruction information may be preinstalled on the forwarder, or the uplink flow table may be established as the second instruction information according to a DHCP request packet in the address request after the processor 1302 receives, by using the communications unit 1301, the address request sent by the forwarder, which is not limited in this embodiment.

This embodiment provides a control device 100, which implements, if a control plane is separated from a forwarding plane, a function that enables a user to acquire an IP address in a DHCP manner, and compared with other approaches, overcomes a disadvantage that a user cannot acquire an address in a DHCP manner in an SAE network architecture of SDN.

Figure 14:
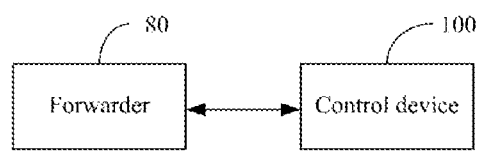
FIG. 14 is a schematic diagram of an IP address allocation system according to an embodiment of the present disclosure.

An embodiment of the present disclosure provides an IP address allocation system. As shown in FIG. 14, the IP address allocation system implements separation between a control plane and a forwarding plane, and includes a forwarder 80 and a control device 100, where the forwarder 80 is any forwarder shown in FIG. 8 and FIG. 9, and the control device 100 is any control device shown in FIG. 10 and FIG. 11, or the forwarder 80 is the forwarder shown in FIG. 12, and the control device 100 is the control device shown in FIG. 13.

This embodiment provides an IP address allocation system, which implements, if a control plane is separated from a forwarding plane, a function that enables a user to acquire an IP address in a DHCP manner, and compared with other approaches, overcomes a disadvantage that a user cannot acquire an address in a DHCP manner in an SAE network architecture of SDN.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The foregoing integrated unit may be implemented in a form of hardware, or may be implemented in a form of hardware in addition to a software functional unit.

The foregoing integrated unit that is implemented in a form of a software functional unit may be stored in a computer-readable storage medium. The foregoing software functional unit is stored in a storage medium and includes several instructions for instructing a computer device (which may be a personal computer, a server, a network device, or the like) to perform some of the steps of the methods described in the embodiments of the present disclosure. The foregoing storage medium includes any medium that can store program code, such as a universal serial bus (USB) flash drive, a removable hard disk, a read-only memory (ROM), a RAM, a magnetic disk, or an optical disc.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not cause the essence of corresponding technical solutions to depart from the scope of the technical solutions of the embodiments of the present disclosure.

The invention claimed is:

1. A communications system in which a control plane is separated from a forwarding plane, wherein the communications system comprises:
    a control device implementing a function of the control plane; and
    a forwarder implementing a function of the forwarding plane, wherein the forwarder is configured to:
        receive Dynamic Host Configuration Protocol (DHCP) information of a user equipment (UE);
        send the DHCP information to the control device;
        receive, from the control device, an Internet Protocol (IP) address allocated to the UE and first information, wherein the first information comprises a downlink flow table on which matching is performed using the IP address, and wherein the downlink flow table indicates that the forwarder sends a packet to the UE when a destination address of the packet is the IP address;
        send the IP address to the UE;
        receive a packet, wherein a destination address of the received packet is the IP address; and
        send the received packet to the UE according to the downlink flow table;
    wherein the control device is configured to:
        receive the DHCP information from the forwarder;
        allocate, in response to receiving the DHCP information, the IP address to the UE; and
        send the IP address and the first information to the forwarder.

2. The communications system of claim 1, further comprising a network device configured to send the DHCP information to the forwarder.

3. The communications system of claim 1, wherein the downlink flow table comprises a matching field comprising the IP address and an instruction set corresponding to the matching field.

4. An address allocation method applied in a system in which a control plane is separated from a forwarding plane, wherein the address allocation method comprises:
    receiving, by a control device implementing a function of the control plane, Dynamic Host Configuration Protocol (DHCP) information of a user equipment (UE) from a forwarder implementing a function of the forwarding plane;
    allocating, by the control device in response to receiving the DHCP information, an Internet Protocol (IP) address to the UE; and
    sending, by the control device to the forwarder, the IP address and first information, wherein the first information comprises a downlink flow table on which matching is performed using the IP address, and wherein the downlink flow table indicates that the forwarder sends a packet to the UE when a destination address of the packet is the IP address.

5. The address allocation method of claim 4, wherein the downlink flow table comprises a matching field comprising the IP address and an instruction set corresponding to the matching field.

6. The address allocation method of claim 5, wherein the instruction set instructs to send the packet to the UE.

7. The address allocation method of claim 4, further comprising:
    receiving, by the forwarder, the DHCP information;
    sending, by the forwarder, the DHCP information to the control device;
    receiving, by the forwarder from the control device, the IP address and the first information; and
    sending, by the forwarder, the IP address to the UE according to the first information.

8. The address allocation method of claim 7, further comprising:
    receiving, by the forwarder, the packet, wherein the destination address of the packet is the IP address; and
    sending, by the forwarder, the packet to the UE according to the downlink flow table.

9. The address allocation method of claim 7, further comprising sending, by a network device, the DHCP information to the forwarder.

10. A control device of a core network for a system in which a control plane is separated from a forwarding plane, wherein the control device implements a function of the control plane and comprises:
    a processor; and
    a memory coupled to the processor, wherein the memory comprises instructions executable by the processor to cause the control device to:
        receive Dynamic Host Configuration Protocol (DHCP) information of a user equipment (UE) from a forwarder implementing a function of the forwarding plane;
        allocate, in response to receiving the DHCP information, an Internet Protocol (IP) address to the UE; and
        send the IP address and first information to the forwarder, wherein the first information comprises a downlink flow table on which matching is performed using the IP address, and wherein the downlink flow table indicates that the forwarder sends a packet to the UE when a destination address of the packet is the IP address.

11. The control device of claim 10, wherein the downlink flow table comprises a matching field comprising the IP address and an instruction set corresponding to the matching field.

12. The control device of claim 11, wherein the instruction set instructs to send the packet to the UE.

13. A method applied in a system in which a control plane is separated from a forwarding plane, wherein the method comprises:
receiving, by a forwarder implementing a function of the forwarding plane, Dynamic Host Configuration Protocol (DHCP) information of a user equipment (UE);
sending, by the forwarder, the DHCP information to a control device implementing a function of the control plane;
receiving, by the forwarder from the control device, an Internet Protocol (IP) address allocated to the UE and first information, wherein the first information comprises a downlink flow table on which matching is performed using the IP address, and wherein the downlink flow table indicates that the forwarder sends a packet to the UE when a destination address of the packet is the IP address;
sending, by the forwarder, the IP address to the UE;
receiving, by the forwarder, a packet, wherein the destination address of the received packet is the IP address; and
sending, by the forwarder, the received packet to the UE according to the downlink flow table.

14. The method of claim 13, wherein the downlink flow table comprises a matching field comprising the IP address and an instruction set corresponding to the matching field.

15. A forwarder of a core network for a system in which a control plane is separated from a forwarding plane, wherein the forwarder implements a function of the forwarding plane and comprises:
a processor; and
a memory coupled to the processor, wherein the memory comprises instructions executable by the processor to cause the forwarder to:
receive Dynamic Host Configuration Protocol (DHCP) information of a user equipment (UE);
send the DHCP information to a control device implementing a function of the control plane;
receive, from the control device, an Internet Protocol (IP) address allocated to the UE and first information, wherein the first information comprises a downlink flow table on which matching is performed using the IP address, and wherein the downlink flow table indicates that the forwarder sends a packet to the UE when a destination address of the packet is the IP address;
send the IP address to the UE;
receive a packet, wherein the destination address of the received packet is the IP address; and
send the received packet to the UE according to the downlink flow table.

16. The forwarder of claim 15, wherein the downlink flow table comprises a matching field comprising the IP address and an instruction set corresponding to the matching field.

17. An address allocation method applied in a system in which a control plane is separated from a forwarding plane, wherein the address allocation method comprises:
receiving, by a forwarder implementing a function of the forwarding plane, Dynamic Host Configuration Protocol (DHCP) information of a user equipment (UE);
sending, by the forwarder, the DHCP information to a control device implementing a function of the control plane;
receiving, by the control device, the DHCP information from the forwarder;
allocating, by the control device in response to receiving the DHCP information, an Internet Protocol (IP) address to the UE;
sending, by the control device to the forwarder, the IP address and first information, wherein the first information comprises a downlink flow table on which matching is performed using the IP address, and wherein the downlink flow table indicates that the forwarder sends a packet to the UE when a destination address of the packet is the IP address;
receiving, by the forwarder from the control device, the IP address and the first information;
sending, by the forwarder, the IP address to the UE;
receiving, by the forwarder, a packet, wherein the destination address of the received packet is the IP address; and
sending, by the forwarder, the received packet to the UE according to the downlink flow table.

18. The address allocation method of claim 17, wherein the downlink flow table comprises a matching field comprising the IP address and an instruction set corresponding to the matching field.

19. The address allocation method of claim 18, wherein the downlink flow table further comprises a counter.

20. The address allocation method of claim 18, wherein the matching field comprises a 10-tuple field.

* * * * *